(12) United States Patent
Yvin et al.

(10) Patent No.: US 8,336,491 B2
(45) Date of Patent: Dec. 25, 2012

(54) INJECTOR FOR INJECTING A SUBSTANCE INTO EGGS

(75) Inventors: Jean-Claude Yvin, Plougoulm (FR);
Michaël Nadreau, Landivisiau (FR);
Ephrem Adjanohoun, Pace (FR)

(73) Assignee: Ceva Sante Animale, Libourne (FR)

( * ) Notice: Subject to any disclaimer, the term of this patent is extended or adjusted under 35 U.S.C. 154(b) by 253 days.

(21) Appl. No.: 12/527,536

(22) PCT Filed: Feb. 12, 2008
(Under 37 CFR 1.47)

(86) PCT No.: PCT/EP2008/001046
§ 371 (c)(1),
(2), (4) Date: Dec. 15, 2009

(87) PCT Pub. No.: WO2008/098731
PCT Pub. Date: Aug. 21, 2008

(65) Prior Publication Data
US 2010/0139567 A1     Jun. 10, 2010

(30) Foreign Application Priority Data
Feb. 16, 2007   (FR) ...................... 07 01153

(51) Int. Cl.
*A01K 45/00* (2006.01)

(52) U.S. Cl. ........................ 119/6.8; 119/6.6

(58) Field of Classification Search ............... 119/6.8, 119/6.6, 174, 6.5, 50.7; 604/313
See application file for complete search history.

(56) References Cited

U.S. PATENT DOCUMENTS

| | | | |
|---|---|---|---|
| 4,469,047 A * | 9/1984 | Miller | 119/6.8 |
| 4,681,063 A * | 7/1987 | Hebrank | 119/6.8 |
| 4,768,919 A | 9/1988 | Borgman et al. | |
| 4,805,778 A | 2/1989 | Nambu | |
| 4,903,635 A | 2/1990 | Hebrank | |
| 4,980,971 A | 1/1991 | Bartschat et al. | |
| 5,136,979 A * | 8/1992 | Paul et al. | 119/6.8 |

(Continued)

FOREIGN PATENT DOCUMENTS
EP     1 302 102 A2   4/2003
(Continued)

OTHER PUBLICATIONS

International Preliminary Report on Patentability and Written Opinion dated May 4, 2010 from International Application No. PCT/EP2008/063997.

(Continued)

*Primary Examiner* — T. Nguyen
(74) *Attorney, Agent, or Firm* — Patterson Thuente Christensen Pedersen, P.A.

(57) ABSTRACT

An injector for injecting at least one substance into eggs, comprising an injection body that can be moved between a raised position and an injection position, and equipped with an injection conduit, an injection needle, a guiding and protection tube of the needle subject to elastic stress by elastic means to an idle position and capable of being moved towards a retracted position by pressing its distal end against an egg when the injector is in the injection position. The injector is equipped with control means for controlling the supply of said injection conduit with at least one substance, said tube cooperating with said control means to disable the supply of said injection conduit when said tube is in the idle position and to enable the supply of said conduit when said tube is in the retracted position.

10 Claims, 3 Drawing Sheets

U.S. PATENT DOCUMENTS

| | | | |
|---|---|---|---|
| 5,895,192 A | 4/1999 | Parnell et al. | |
| 5,898,488 A | 4/1999 | Kuhl | |
| 5,941,696 A | 8/1999 | Fenstermacher et al. | |
| 6,286,455 B1* | 9/2001 | Williams | 119/6.8 |
| 6,499,428 B1* | 12/2002 | Prindle | 119/6.8 |
| 6,535,277 B2 | 3/2003 | Chalker, II et al. | |
| 2003/0150387 A1 | 8/2003 | Hebrank | |
| 2004/0065263 A1 | 4/2004 | Hebrank et al. | |
| 2005/0030521 A1 | 2/2005 | Phelps et al. | |
| 2005/0132964 A1* | 6/2005 | Breuil et al. | 119/6.8 |
| 2005/0284376 A1 | 12/2005 | Smith | |
| 2006/0082759 A1 | 4/2006 | Hebrank | |
| 2006/0185601 A1 | 8/2006 | Correa et al. | |
| 2007/0044721 A1* | 3/2007 | Ilich | 119/6.8 |
| 2010/0180821 A1* | 7/2010 | Poulard et al. | 119/6.8 |
| 2010/0221093 A1 | 9/2010 | Mogenet et al. | |
| 2010/0307419 A1* | 12/2010 | Nadreau et al. | 119/6.8 |
| 2012/0017835 A1 | 1/2012 | Nadreau et al. | |

FOREIGN PATENT DOCUMENTS

| | | |
|---|---|---|
| EP | 1 557 083 A2 | 7/2005 |
| FR | 2858919 | 2/2005 |
| FR | 2 873 894 A1 | 2/2006 |
| WO | WO98/31216 | 7/1998 |
| WO | WO2006/078499 | 7/2006 |

OTHER PUBLICATIONS

International Preliminary Report on Patentability and Written Opinion dated Mar. 2, 2010 from International Application No. PCT/EP2008/061250.

Application and File History for U.S. Appl. No. 12/740,649, filed Apr. 29, 2010, inventors Nadreau et al.

Application and File History for U.S. Appl. No. 12/675,946, filed Mar. 1, 2010, inventors Nadreau et al.

Application and File History for U.S. Appl. No. 12/527,541, filed May 4, 2010, inventors Mogenet et al.

* cited by examiner

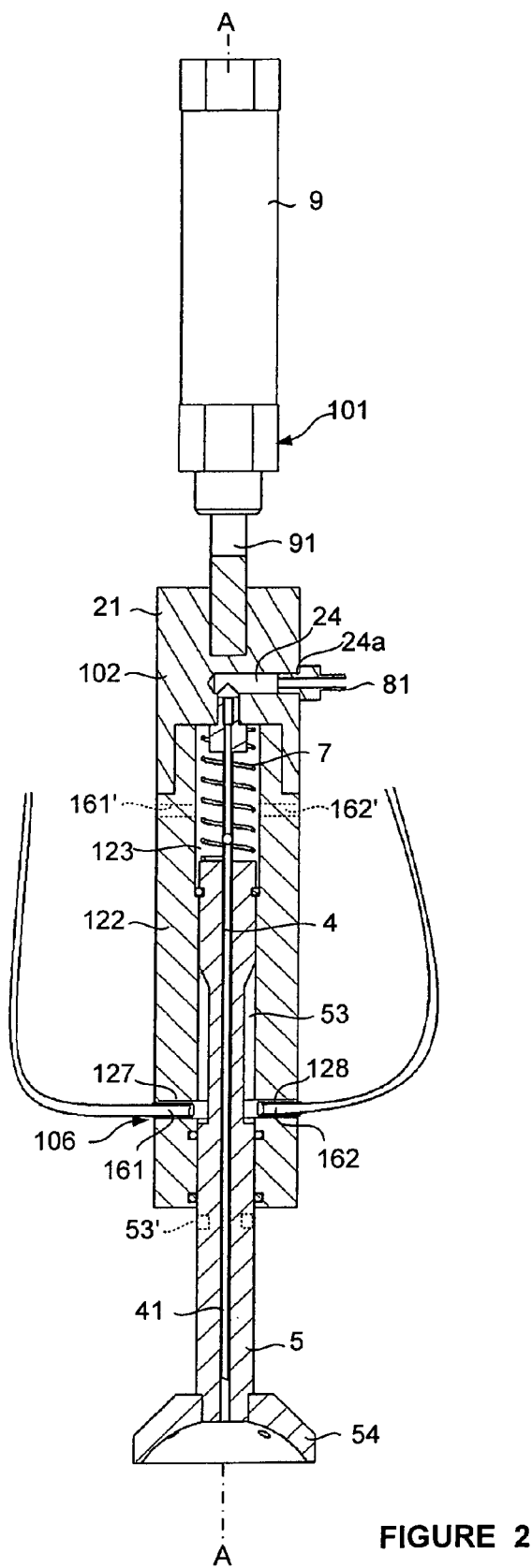
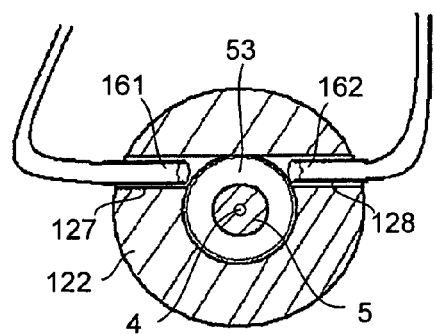
FIGURE 3
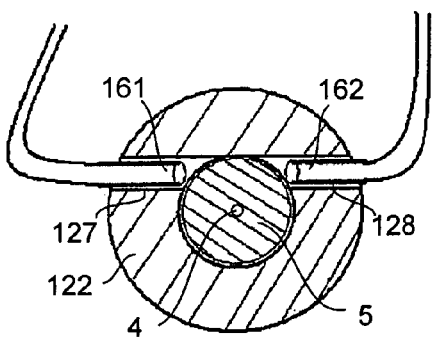
FIGURE 4
FIGURE 2

INJECTOR FOR INJECTING A SUBSTANCE INTO EGGS

PRIORITY CLAIM

The present application is a National Phase entry of PCT Application No. PCT/EP2008/001046, filed Feb. 12, 2008, which claims priority from French Application No. 0701153, filed Feb. 16, 2007, the disclosures of which are hereby incorporated by reference herein in their entirety.

FIELD OF THE INVENTION

The present invention relates to an injector for injecting substance into eggs, particularly birds' eggs.

BACKGROUND OF THE INVENTION

Injection devices are known in the prior art that inject treatment substances, such as vaccines, antibiotics or vitamins, directly into eggs, in order to limit the mortality rate or increase embryo growth. Such devices conventionally comprise an injection head which comprises a plurality of vertically moveable injectors above a routing conveyor of eggs to be treated, the eggs being conventionally positioned in cells of so-called incubation trays. Patent document FR 2 873 894 particularly proposes an injection head wherein each injector is equipped with its own movement system to move the injector from a raised position to an injection position wherein its needle can inject a substance into the egg. The needle is housed in a telescopic guiding and protection bush or tube. This tube is mounted in a moveable manner with respect to the needle between a retracted position wherein the needle is projecting with respect to the distal end of the tube, and an idle position wherein the tube surrounds at least the distal part of the needle. The tube is subject to elastic stress by elastic means towards its idle position. When the injector has lowered to its injection position, the tube presses via its distal end against the egg and moves to its retracted position.

In the poultry industry, particularly the chicken industry, the incubation trays contain a non-negligible proportion of "clear" eggs, i.e. unfertilised eggs, and/or "non-live" eggs, i.e. comprising dead embryos. So as to only treat the fertilised and live eggs on the trays, and thus optimise the treatment substance consumption, the abovementioned patent document proposes to successively perform, for each tray, a candling operation of the eggs on a tray, in order to differentiate fertilised and live eggs from clear or non-live eggs, a clear or non-live egg removal operation from the trays, a detection operation of the remaining eggs on the tray and, finally, an injection operation of the remaining eggs detected. The detection of the remaining eggs is carried out upstream from the injection device by means of a transversal ramp of optical detectors capable of differentiating empty cells from cells containing an egg. The injectors are then selectively controlled by a control unit according to the signals generated by the detectors, and received, processed and stored by the control unit. For each cell containing an egg, the control unit starts an injector injection cycle, said cycle comprising the lowering of the injector to its injection position, the injection of the substance via the needle, and the return to the raised position.

SUMMARY OF THE INVENTION

The aim of the present invention is to propose an alternative solution to selectively injecting fertilised and live eggs, and particularly to inject a substance only in cells containing an egg, that is simple in terms of design and use.

To this end, the present invention proposes to detect the presence of an egg in each injector during an injection cycle, using the movements of its guiding and protection tube, said guiding and protection tube leaving its idle position only when it presses against an egg.

Therefore, the present invention relates to an injector for injecting at least one substance into eggs, said injector comprising:

an injection body intended to be mounted on a support in a vertically moveable manner between a raised position and an injection position wherein the injectors are capable of injecting at least one substance into eggs, positioned for example facing each other in cells, said body being equipped with an injection conduit comprising an inlet for the supply of at least one substance to be injected, an injection needle mounted on said body and communicating with said injection conduit, and a guiding and protection tube for the guiding and protection of said needle, mounted in a moveable manner on said injection body between a retracted position wherein the needle is projecting with respect to the distal end of said tube, and an idle position wherein said tube surrounds at least the distal part of the needle, said tube being subject to elastic stress by elastic means to its idle position and being capable of being moved to its retracted position by pressing its distal end against an egg when the injector is in the injection position, said injector being characterised in that it is equipped with control means for controlling the supply of said injection conduit with at least one substance, said guiding and protection tube cooperating with said control means to disable the supply of said injection conduit when said tube is in the idle position and to enable the supply of said conduit when said tube is in the retracted position.

In this way, in the case of an injection head comprising several injectors, all the injectors may be moved to the lower injection position, by means of a common movement system or individual movement systems controlled by a control unit, only the injectors having their tube in a retracted position will then be controlled and/or supplied with substance for the injection of substance via their needle. The management of all the injectors by the control unit proves to be particularly simple as each injector controls its own injection or not of substance at each injection cycles, the control unit no longer having to process and store a set of data relating to the presence or not of eggs in the cells of one or more trays to be subsequently able to control injector injection cycles to process the trays.

According to a first embodiment, said control means comprise a supply circuit for supplying substance to said injection conduit, the guiding and protection tube being capable of closing said supply circuit in its idle position. In this embodiment, a control unit may start the injector injection cycles non-selectively, each injector enabling or not the passage of the substance into the injection conduit and the needle at each injection cycle.

Advantageously, said injection body comprises a lower tubular part in the inner passage whereof the guiding and protection tube is mounted in a sliding manner, said supply circuit comprises a first channel, intended to be connected by an inlet to a dispensing system of substance to be injected, which opens via an outlet into the inner passage, and a second channel opening via an inlet into said inner passage and connected by an outlet to the injection conduit, said tube being capable of closing in its idle position the outlet of the first channel, in a substantially tight manner, and connecting the first channel and the second channel in its retracted position. The guiding and protection tube may slide in a substantially tight manner in the inner passage of the injection body and comprises an annular groove suitable for connecting the first channel and the second channel. The first channel and second channel pass for example radially to either end of the lower tubular part, the outlet of the second channel being connected via an outer duct to the inlet of the injection conduit.

In a second embodiment, said control means comprise detection means for detecting the position of the guiding and protection tube, said detection means being intended to be connected to a control unit which controls the substance supply of the injection conduit according to the position detected by said detection means. In this embodiment, a control unit may start injector injection cycles non-selectively and, for each injector injection cycle, the control unit controls the injection according to the position of the tube detected.

Said injection body may comprise as described above a lower tubular part in the inner passage whereof the guiding and protection tube is mounted in a sliding manner, and the detection means comprise a light source and an optical sensor opening into said inner passage, said tube being capable of interrupting the light flow from the light source during its movement between its two positions.

In one alternative embodiment, the detection means comprise an electromechanical sensor opening into said inner passage and capable of being activated by the tube during its movement between its two positions.

In another alternative embodiment, said detection means are arranged at the distal end of the guiding and protection tube and are capable of detecting the pressing of said tube against an egg. Advantageously, the tube is equipped at its distal end with a centring and pressing cup intended to press against the surface of an egg to be injected, the detection means being capable of detecting a variation in the ambient luminosity in the cup, said means comprise for example an optical fibre opening inside the cup and intended to be connected to a system to analyse the variation in intensity of the light flow carried by the fibre.

Advantageously, the injector also comprises individual movement means capable to moving said injection body between its raised position and its injection position, said injector being intended to be assembled by movement means to a support above the eggs to be treated.

The invention will be understood more clearly, and other aims, details, features and advantages will emerge more clearly in the course of the following detailed explanatory description of current preferred specific embodiments of the invention, with reference to the appended schematic figures.

BRIEF DESCRIPTION OF THE DRAWINGS

FIG. 2 is a similar view to FIG. 1, but of an injector according to a second embodiment;

FIG. 3 is a cross-sectional schematic view of the injector in FIG. 2, at its detection means, wherein the guiding and protection tube is in the idle position;

FIG. 4 is a similar view to FIG. 3, but with the guiding and protection tube in the retracted position;

DETAILED DESCRIPTION OF THE INVENTION

Figure 1:
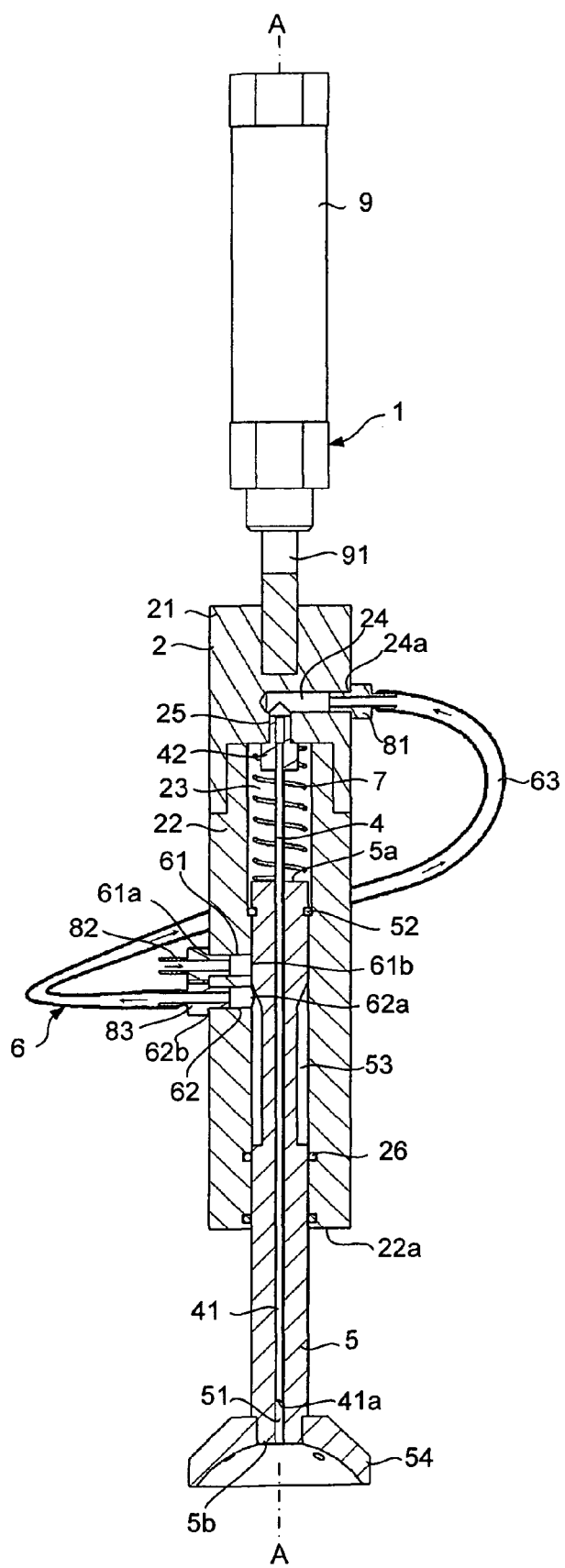
FIG. 1 is a schematic partial longitudinal sectional view of an injector according to a first embodiment, said injector being in the raised position, with its guiding and protection tube in the idle position.

FIG. 1 represents an injector according to a first embodiment wherein the guiding and protection tube directly closes a supply circuit of the injector when it is not in a retracted position.

The injector 1 comprises a body 2, generally cylindrical in shape, having a longitudinal axis A, comprising a solid upper part 21 and a hollow tubular lower part 22 with an inner passage 23. The upper part is equipped with an injection conduit 24 extending radially substantially from the longitudinal axis A to the outer peripheral surface. The inlet 24a of the conduit is equipped with a connection fitting 81 for connecting a duct for the supply thereof with a substance to be injected. The upper part also comprises an axial bore 25, connecting the inner passage 23 and the injection conduit 24, for the assembly of an injection needle 4. The needle comprises a hollow rod 41, for example made of stainless steel, with a bevelled distal end 41a and a proximal end equipped with a tubular fitting 42 to enable the assembly thereof with the injection body by inserting said fitting into the axial bore 25. The needle extends in the inner passage 23, and its distal end 41a is arranged beyond the lower end 22a of the lower part of the injection body. In the present embodiment, the needle is also used to perforate the egg shell.

A needle guiding and protection tube 5, also referred to as a sleeve or bush, is mounted in a sliding manner in the inner passage 23 of the lower part and is actuated to a so-called idle position by a compression spring 7 mounted between the proximal end 5a of the tube and the upper part 21. The tube receives, in its inner passage 51, the needle so as to guide and protect same. For the assembly of the tube 5, the lower part and the upper part consist of two separate components assembled with each other, for example by means of threadable engagement. In its idle position illustrated in FIG. 1, the tube is at a stop via an O-ring 52 against a shoulder of the inner passage, the distal end 41a of the needle is arranged in the tube offset with respect to the distal end 5b of said tube. The tube comprises at its distal end a fitting 54 in the form of a centring and pressing cup, for example made of a soft material, such as silicone, intended to partially cover the egg to be treated.

In the present embodiment, the injector comprises its own movement system, in this case formed by a pneumatic cylinder 9. The injection body is mounted via its upper part 21 at the end of the cylinder rod 91. Several injectors will for example be mounted vertically via the cylinder part of their cylinder on injection ramps of an injection head, said ramps being arranged substantially horizontally and transversally above an incubation tray conveyor.

To inject an egg, the cylinder is actuated by a control unit to lower the injection body onto the egg in an injection position. When the cup 54 comes into contact with the egg, the tube retracts in the lower part of the body against the spring, until it comes to a retracted position, for example at a stop against the needle fitting. This retraction movement thus enables the needle to project from the tube, perforate the shell and the outer shell membrane of the egg to enter the egg. When the injection body is returned to the raised position in FIG. 1, the tube returns to the idle position under the effect of the spring. The length of the needle, the length of the tube and the stroke of the tube in the inner passage are for example defined such that the needle penetrates the egg by approximately 20 to 25 mm. Interchangeable sets of tubes, needles and lower parts of injection bodies of different lengths may be provided according to the location where the substance is to be injected, for example, in the air pocket, amniotic fluid or embryo.

The injector comprises a substance supply circuit 6 connected to the inlet 24a of the injection conduit. This supply circuit comprises two channels provided in the tubular wall of the lower part 22, and passing therethrough at either end. A first channel 61 is intended to be connected, via its inlet 61a, to a dispensing system of substance to be injected. Said dispensing system will be controlled by the injector control unit and comprises substance metering means to make it possible to dispense a determined quantity of substance. The inlet of the first conduit is equipped with a fitting 82 for the connection thereof to said dispensing system via a conduit (not shown). For example, this system is of the automatic syringe type, comprising a syringe associated with a syringe piston controlled by the control unit. The outlet 61b of the first conduit opens into the inner passage 23 and is sealed by the tube when said tube is in the idle position. The second conduit 62 comprises an inlet 62a opening into the inner passage, and an outlet 62b equipped with a fitting 83 to be connected to the inlet of the injection conduit via an outer flexible duct 63. The tube comprises a groove 53 arranged below the first conduit 61 in the idle position of the tube, and wherein the outlet 61b of the first conduit and the inlet 62b of the second conduit open when the tube is in a retracted position. In the present embodiment, the second conduit 62 is offset longitudinally downwards with respect to the first conduit and opens onto the annular groove in the idle position of the tube. In an alternative embodiment, both conduits may be arranged in the same transversal plane, for example symmetrically with respect to the axis A. The inlet 62a of the second conduit is then sealed by the tube in the idle position, the groove being able to extend along a lower height.

To ensure a substantially tight fluid communication between both conduits 61, 62 in a retracted tube position, the tube slides in a tight manner in the inner passage, the above mentioned O-ring 52 ensuring the tightness of the top of the groove, whereas O-rings 26 are mounted in annular grooves of the inner wall of the lower part 22 to ensure tightness below the groove.

In operation, the control unit activates the cylinder 9 to move the injector to its injection position as described above, and controls the dispensing system to dispense a determined quantity of substance to be injected. In the presence of an egg, the tube 5 is in the retracted position, and ensures the fluid communication between the two conduits 61, 62, the substance passes via the first conduit 61, the groove 53, the second conduit 62, the duct 63 and in the injection conduit 24 and the needle 4 to be injected into the egg. In the absence of eggs, the tube 5 remains in its idle position and seals the outlet 61b of the first conduit.

FIG. 2 illustrates a second embodiment, wherein the injector 101 comprises detection means mounted on the lower part of the injection body to detect the position of the tube, the information being intended to be transmitted to the control unit of the injector to control the dispensing system connected directly to the inlet of the injection conduit or not. The detection means are formed by an optical system 106 comprising a light source 161 and an optical sensor 162.

The components of this injector which are identical to that in FIG. 1 bear the same references as in FIG. 1, i.e. the needle 4, the tube 5, the cylinder 9 and the upper part 21 of the injection body. This injector 101 is differentiated from the previous one in that the lower part 122 of the injection body 102 comprises two transversal bores 127, 128 opening into its inner passage 123 for the opposing assembly of a light source 161 and an optical sensor 162. The source and the sensor are arranged in the same transversal plane and in the same longitudinal plane which is offset with respect to the longitudinal axis A, such that, in the idle position illustrated in FIGS. 2 and 3, the source and the sensor open into the groove 53 of the tube, the light beam emitted by the source entering the groove and being received by the sensor. In the retracted tube position, the tube groove is arranged above the source and the sensor. The light beam is interrupted by the tube. The tube prevents the beam from passing through the inner passage and thus reaching the sensor, as illustrated in FIG. 3. The sensor 162 is connected to the control unit which controls the dispensing system according to the signals transmitted by the sensor, the substance dispensing system being directly connected to the inlet 24a of the injection duct. The source may be activated continuously or be activated by the control unit.

In operation, the control unit activates the cylinder to move the injector to the injection position and controls the light source emission. In the presence of an egg, the tube moves to its retracted position. The sensor detects the interruption of the light beam, and the control unit then activates the dispensing system to dispense a determined quantity of substance to the injection conduit. The control unit deactivates the source and controls the cylinder to return the injector to its raised position.

In an alternative embodiment, the source and the sensor are mounted above the proximal end of the tube in the idle position, in bores represented in dotted lines under the references 161' and 162'. In another alternative embodiment, the source and the sensor are mounted as above in bores 127 and 128, the tube groove being replaced by another groove, represented schematically in dotted lines under the reference 53', enabling the passage of the light beam in the retracted position of the tube. In this case, the tube interrupts the light beam in the idle position and the control unit only activates the dispensing system when the sensor detects the light beam.

Figure 5:
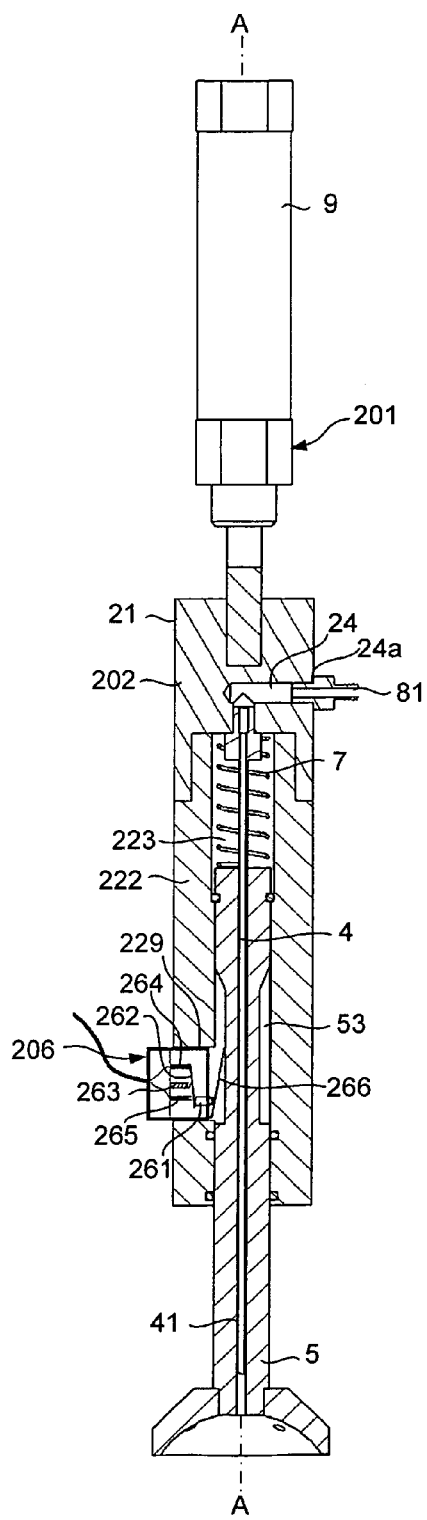
FIG. 5 is a similar view to FIG. 2, but of an injector according to a third embodiment; and, FIG. 6 is a similar view to FIG. 2, but of an injector according to a fourth embodiment.

FIG. 5 illustrates an alternative embodiment of the injector in FIG. 2, wherein the optical detection system is replaced by an electromechanical sensor 206 mounted in a bore 229 of the lower part 222 of the injection body 202 and opening into the inner passage 223.

The electromechanical sensor of the injector 201 is of the push button type. It comprises a block 261 mounted on a strip 262 subjected to elastic stress by a spring in the direction of the passage in an idle position. In the idle position of the tube, the block is at the level of the groove 53. During the movement of the tube to its retracted position, the tube moves the block against the spring to a retracted position wherein the strip closes an electric circuit making an electric contact between two terminals 264, 265. For a progressive movement of the block between its two positions, an elastic strip 266 is inserted between the block and the tube, this strip 266 extending into the groove 53 in the idle position of the tube, while the block remains offset with respect to the inner passage 223 in its idle position. The control unit, whereto said sensor is connected, only actuates the dispensing system when an electric contact is made between the terminals.

Figure 6:
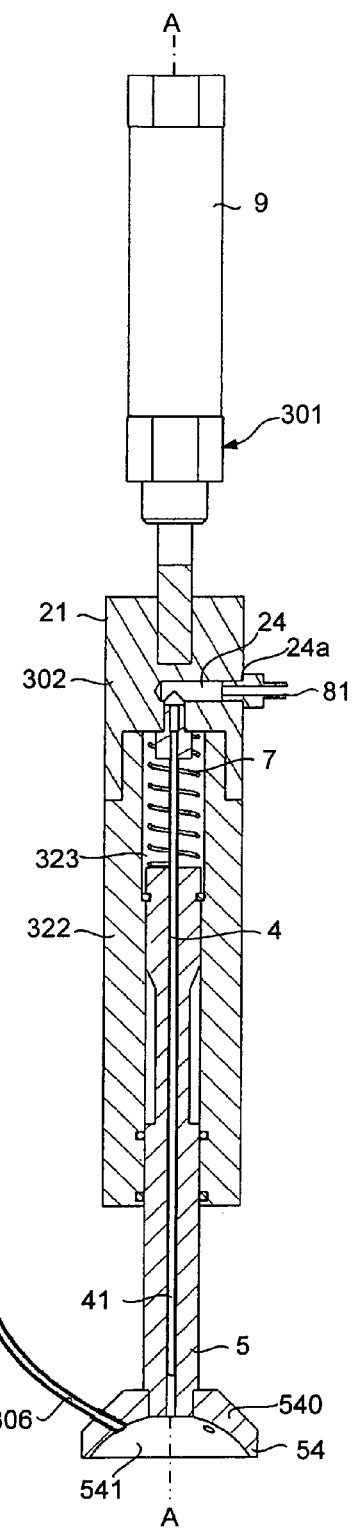

FIG. 6 illustrates another alternative embodiment wherein the injector 301 is equipped with means to detect the retracted position of the tube, said means operating by detecting the pressing thereof against an egg, and more specifically by detecting the ambient luminosity variation in the pressing and centring cup 54.

The cup is equipped with an optical fibre 306 passing through the wall 540 of the cup and opening onto the inner surface 541 of the cup. This optical fibre is intended to be connected at the end to an analysis system (not shown) capable of detecting variations in the light flow transmitted by the optical fibre and therefore variations in the ambient luminosity inside the cup. In the presence of an egg, the pressing of the cup against the egg causes a sudden change in the ambient luminosity inside the cup. The control unit, whereto the analysis system is connected, will only actuate the dispensing system connected to the inlet 24*a* of the injection conduit, if the analysis system detects such a change in luminosity.

In the embodiments described here with reference to the figures, the injectors are intended to be connected to a substance dispensing system comprising substance metering means. In an alternative embodiment, the injector may be equipped with its own metering means, the injector comprising for example filling and draining means of an injection chamber provided in the injection body as described in patent document FR 2 873 894 mentioned above. The injector control means will then be adapted to control the substance supply of its injection conduit connected to said injection chamber. The injector may also comprise a punching tube to perforate the egg shell, the needle sliding in said punching tube which is for example attached to the protection tube.

Although the invention has been described with reference to specific embodiments, it is evident that it is in no way limited and that it comprises all the technical equivalents of the means described and the combinations thereof if they fall within the scope of the invention.

The invention claimed is:

1. An injector for injecting at least one substance into eggs, said injector comprising:
    an injection body for operable coupling to a support in a vertically moveable manner between a raised position and an injection position, said body being equipped with an injection conduit comprising an inlet for the supply of at least one substance to be injected;
    an injection needle operably coupled to said body and communicating with said injection conduit; and
    a guiding and protection tube for the guiding and protection of said needle, operably movably coupled to said injection body between a retracted position wherein the needle is projecting with respect to the distal end of said tube, and an idle position wherein said tube surrounds at least the distal part of the needle, said tube being subject to elastic stress by an elastic element towards its idle position and being movable to its refracted position by pressing its distal end against an egg when the injector is in the injection position,
    wherein said injector is equipped with control means for controlling the supply of said injection conduit with at least one substance, said guiding and protection tube cooperating with said control means to disable the supply of said injection conduit when said tube is in the idle position and to enable the supply of said conduit when said tube is in the retracted position.

2. An injector according to claim 1, wherein said control means comprise a supply circuit for supplying substance to said injection conduit, the guiding and protection tube operable for closing said supply circuit in its idle position.

3. An injector according to claim 2, wherein said injection body comprises a lower tubular part in an inner passage wherein the guiding and protection tube is slideably coupled, said supply circuit comprises a first channel, for operably coupling a first inlet to a dispensing system of the substance to be injected, which opens via a first outlet into the inner passage, and a second channel opening via a second inlet into said inner passage and connected by a second outlet to the injection conduit, said tube operable for closing in its idle position the first outlet of the first channel and connecting the first channel and the second channel in its retracted position.

4. An injector according to claim 3, wherein the guiding and protection tube is slideably coupled in a substantially tight manner in the inner passage of the injection body and comprises an annular groove suitable for connecting the first channel and the second channel.

5. An injector according to claim 4, wherein the first channel and second channel pass radially to either end of the lower tubular part, and the second outlet of the second channel is operably connected via an outer duct to the inlet of the injection conduit.

6. An injector according to claim 1, wherein said control means comprise detection means for detecting the position of the guiding and protection tube, said detection means for operable coupling to a control unit which controls the substance supply of the injection conduit according to the position detected by said detection means.

7. An injector according to claim 6, wherein said injection body comprises a lower tubular part in an inner passage wherein the guiding and protection tube is operably coupled in slideable engagement, the detection means comprise a light source and an optical sensor opening into said inner passage, said tube operable for interrupting the light flow from the light source during its movement between its two positions.

8. An injector according to claim 6, wherein said injection body comprises a lower tubular part in an inner passage wherein the guiding and protection tube is operably coupled in slideable engagement, the detection means comprise an electromechanical sensor opening into said inner passage and activatable by the tube during its movement between its two positions.

9. An injector according to claim 6, wherein said detection means are arranged at the distal end of the guiding and protection tube and are operable for detecting the pressing of said tube against an egg.

10. An injector according to claim 9, wherein the tube is equipped at its distal end with a centering and pressing cup intended to press against the surface of an egg to be injected, the detection means operable for detecting a variation in the ambient luminosity in the cup.

* * * * *